J. NIELSEN.
MILKING MACHINE.
APPLICATION FILED MAR. 20, 1911.

1,017,580.

Patented Feb. 13, 1912.

2 SHEETS—SHEET 1.

Witnesses:
C. Heymann
A. J. Moran

Inventor:
Jens Nielsen
by B. Singer
atty

COLUMBIA PLANOGRAPH CO., WASHINGTON, D. C.

J. NIELSEN.
MILKING MACHINE.
APPLICATION FILED MAR. 20, 1911.

1,017,580.

Patented Feb. 13, 1912.
2 SHEETS—SHEET 2.

Witnesses:
C. Heymann
A. J. Moran

Inventor:
Jens Nielsen
by B. Singer atty.

UNITED STATES PATENT OFFICE.

JENS NIELSEN, OF COPENHAGEN, DENMARK.

MILKING-MACHINE.

1,017,580.  Specification of Letters Patent.  Patented Feb. 13, 1912.

Application filed March 20, 1911. Serial No. 615,772.

*To all whom it may concern:*

Be it known that I, JENS NIELSEN, a subject of the King of Denmark, residing at Forchhammersvej 32, Frederiksberg, by Copenhagen, Denmark, have invented new and useful Improvements in Milking-Machines, of which the following is a specification.

My present invention relates to milking machines in which movement is imparted to the milking shields through a combination of eccentrics, levers and spring action suitably connected by a flexible means to a source of power.

The objects of my invention are to provide means whereby the outer shields of a plurality of co-acting shields have counter movement resulting in that they are separated or brought together simultaneously, the former condition of which facilitates the placing of the device for action, and to transmit movement to the inner shields, when movement thereof is desired, through a resilient means actuated by the outer shields.

Further objects of my invention will be pointed out in the following detailed description, taken in connection with the accompanying drawing, in which,—

Figure 1:
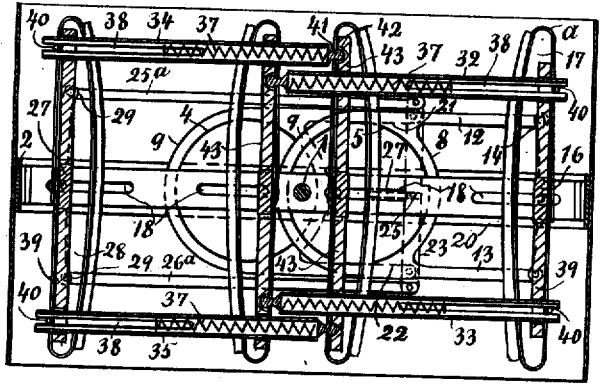
Figure 2:
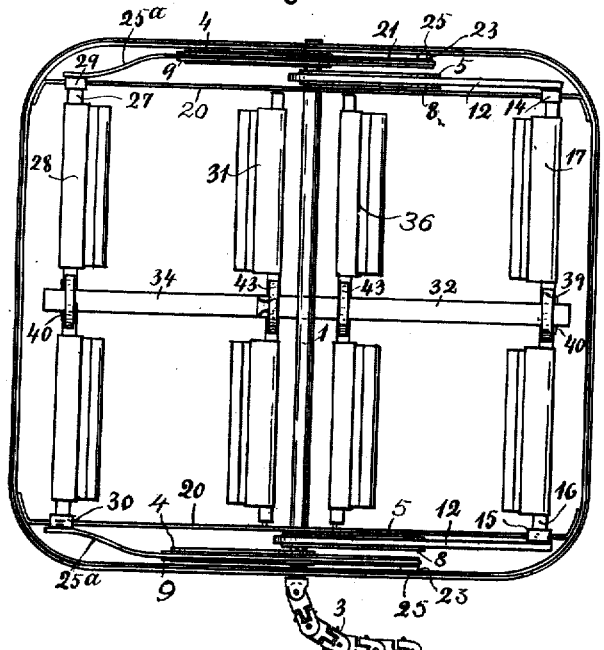
Figure 3:
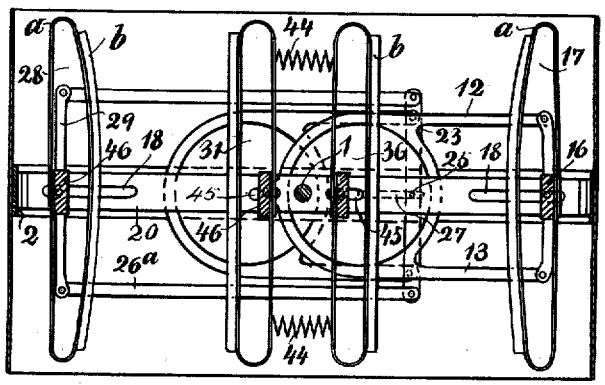
Figure 4:
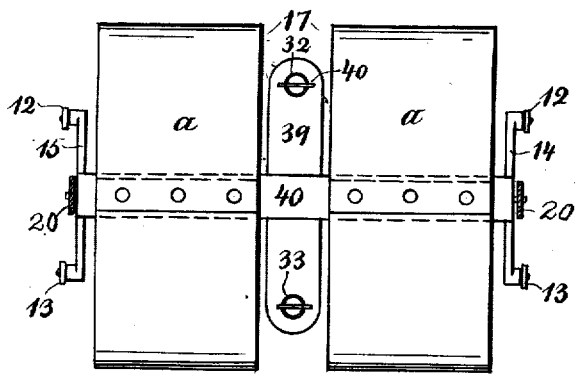
Figure 5:
Figure 6:

Figure 1, is a central vertical section of a milking machine embodying my invention. Fig. 2, is a top plan view of the same. Fig. 3, is a similar view to Fig. 1 showing a modification of my invention. Fig. 4, is an elevation of two of the shields in the same plane with associated parts. Figs. 5 and 6, are detail views of a flexible power transmitting means which may be used in connection with my device.

A driving spindle 1, having bearings in a frame member 2 is adapted to be revolved by means of a flexible shaft 3 connected with a source of power. The shaft 1 has secured thereto, near each end, a pair of eccentrics 4 and 5 which are surrounded by eccentric straps 9 and 8 respectively. The eccentric straps 8 have secured thereto an upper rod 12 and a lower rod 13 which are secured to cross rods 14 and 15 respectively, of the outer shields 17 of two pairs of shields shown to the right of the drive shaft 1, and which are pivoted by a shaft 16 centrally between the rods 14 and 15.

To allow sliding and oscillating movement of the shields a rack 20 is provided with guide slots 18 into which the ends of the shafts forming a pivot for the shields have bearing. In this way the action of the movement imparted by the eccentrics to the shields resembles that of hand milking.

In order that the members of each pair of milking shields may open at the same time, to facilitate the placing of the apparatus for action, the outer shields of the pair of shields to the left of the driving shaft 1 are actuated by means of the eccentrics 4. The eccentric straps of these eccentrics carry rods 21 and 22 pivoted to a cross rod 23 mounted on a shaft 25 mid-way between the pivot points of the rods 21 and 22, and slidable in a slot 27 of the frame 2. From the rod 23, rods $25^a$ and $26^a$ extend in a counter direction to the rods 21 and 22, and are connected to the outer shields 28 at 29, the shields 28 being pivoted by a shaft 27 having bearings in the slots 18.

From the above description it is obvious that a simultaneous counter movement of the outer shields is obtained.

With particular reference to Figs. 1, 2 and 4, means are provided for transmitting movement of the outer shields on one side of the driving shaft 1 to the inner shields on the opposite sides thereof, and by which the latter are adapted to have a co-acting movement with the outer shields on the same side of the driving shaft. This construction consists of an upper tubular member 32 and lower tubular member 33, pivoted at 41 to the base member 43 of the inner shields 31, while a similar pair of tubular members 34 and 35 are pivoted to the base member 43 of the inner shields 36. These tubular members contain compression springs 37, of predetermined length, and are slotted as at 38. The base members 39 of the outer shields 17 and 28 are provided with a pin 40 working in the said slot 38 of the tubular members. By this construction it will be seen that lost motion transmitting means is provided between the inner and outer shields which is only effective when the pins 40 engage the compression spring 37 and, further, that a substantially similar movement is imparted to each alternative pair of shields.

In Fig. 3, the motion transmitting means of the outer shields 17 and 28 is substantially that as shown in Figs. 1, 2 and 4, however, the inner shields 31 and 36 are not actuated by movement of the outer shields but are provided with compression springs 44 which allow them to adjust their position with respect to the co-acting outer shields. The springs 44 are interposed between the shields 31 and 36 at each side of the pivot point thereof, and a slight movement of the pivot point is allowed through the slots 45 in which they have their bearings.

If desired, each of the rods 12, 13, 25ᵃ, and 26ᵃ, may be in two parts, connected by a turn-buckle, or the like, by which the length of the said rods may be adjusted, the effect of such adjustment being to draw the co-acting shields nearer together when the device is being used.

The milking shields are built up of a bowed resilient strip $a$, secured to the base members, and to the working surface of which is secured a cover of rubber $b$, or other yielding material.

From the above description it is made manifest that I provide a milking machine which may be actuated from a source of power remote from the device, and that the co-acting motion transmitted to the milking shields is a simultaneous inward and downward rolling movement during a half revolution of the driving shaft and a counter movement thereof during the remainder of the revolution.

I claim:—

1. In a milking machine, a suitable frame, a plurality of pairs of co-acting shields carried by said frame and capable of longitudinal sliding and oscillatory movement with respect thereto, and means for producing a similar simultaneous counter movement between each of the co-acting shields of all of the pairs.

2. In a milking machine, a suitable frame, a plurality of co-acting shields arranged in oppositely disposed pairs carried by said frame and capable of longitudinal sliding and oscillatory movement with respect thereto, a drive shaft, eccentrics carried by said shaft, and means transmitting movement of said eccentrics for causing a similar simultaneous counter movement of the oppositely disposed shields of each of said pairs.

3. In a milking machine, a suitable frame, a plurality of co-acting shields arranged in opposite pairs and carried by said frame, and means for transmitting a longitudinal sliding and oscillatory movement to the outer shields of each pair.

4. In a milking machine, a suitable frame, a plurality of co-acting shields arranged in opposite pairs and carried by said frame, means for transmitting a simultaneous longitudinal sliding and oscillatory movement to the outer shields of each pair, and motion transmitting means connecting the outer shields with the complementary co-acting shields of the opposite outer shields, combined substantially as and for the purpose set forth.

In testimony whereof I affix my signature in presence of two witnesses.

JENS NIELSEN.

Witnesses:
HANS PEDERSEN,
PETER JENSEN.